(12) United States Patent
Mahieu

(10) Patent No.: US 9,452,950 B2
(45) Date of Patent: Sep. 27, 2016

(54) REFLECTIVE PANEL

(71) Applicant: AGC GLASS EUROPE, Louvain-la-Neuve (BE)

(72) Inventor: Stijn Mahieu, Lovendegem (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 0 days.

(21) Appl. No.: 14/411,309

(22) PCT Filed: Jun. 25, 2013

(86) PCT No.: PCT/EP2013/063180
§ 371 (c)(1),
(2) Date: Dec. 24, 2014

(87) PCT Pub. No.: WO2014/001275
PCT Pub. Date: Jan. 3, 2014

(65) Prior Publication Data
US 2015/0125691 A1    May 7, 2015

(30) Foreign Application Priority Data
Jun. 26, 2012  (BE) .................................. 2012/0435

(51) Int. Cl.
*B32B 15/04* (2006.01)
*B32B 17/06* (2006.01)
*C03C 17/36* (2006.01)
*G02B 5/08* (2006.01)

(52) U.S. Cl.
CPC .......... *C03C 17/3615* (2013.01); *C03C 17/36* (2013.01); *C03C 17/3639* (2013.01); *C03C 17/3663* (2013.01); *G02B 5/0875* (2013.01); *C03C 2217/212* (2013.01); *C03C 2217/213* (2013.01); *C03C 2217/214* (2013.01); *C03C 2217/216* (2013.01); *C03C 2217/26* (2013.01); *Y10T 428/265* (2015.01); *Y10T 428/30* (2015.01); *Y10T 428/31678* (2015.04)

(58) Field of Classification Search
USPC ....... 428/426, 428, 432, 433, 434, 688, 689, 428/697, 699, 701, 702
See application file for complete search history.

(56) References Cited

U.S. PATENT DOCUMENTS

| | | | |
|---|---|---|---|
| 6,425,670 B1 | 7/2002 | Komatsu et al. | |
| 2003/0143401 A1* | 7/2003 | Hukari | ................ C03C 17/3435 428/408 |
| 2003/0180546 A1* | 9/2003 | Stachowiak | ...... B32B 17/10174 428/432 |
| 2004/0053068 A1 | 3/2004 | Schicht et al. | |
| 2005/0079369 A1* | 4/2005 | Stachowiak | ............ B32B 17/06 428/469 |
| 2014/0098415 A1* | 4/2014 | Wuillaume | ......... C03C 17/3626 359/360 |

FOREIGN PATENT DOCUMENTS

| | | |
|---|---|---|
| EP | 0 962 429 A1 | 12/1999 |
| EP | 1 099 671 A1 | 5/2001 |
| WO | 02/42234 A1 | 5/2002 |

OTHER PUBLICATIONS

Pulker (Coatings on Glass), 1998.*
refractiveindex.info Si3N4.*
EP962429 English Machine translation.*
International Search Report issued Oct. 28, 2013 in PCT/EP2013/063180 filed Jun. 25, 2013.

* cited by examiner

*Primary Examiner* — Lauren R Colgan
(74) *Attorney, Agent, or Firm* — Oblon, McClelland, Maier & Neustadt, L.L.P.

(57) ABSTRACT

The invention concerns reflective opaque panels that can be used as facing panels or decorative panels. They consist of a substrate coated with a stack of layers comprising, in the following order, at least (i) a transparent substrate, (ii) a first chromium layer, (iii) a dielectric layer in direct contact with the first chromium layer, and (iv) a second chromium layer, in direct contact with the dielectric layer.

19 Claims, No Drawings

REFLECTIVE PANEL

The present invention relates to reflective panels in particular consisting of a substrate coated with a stack of layers. More particularly, the invention relates to a glazing unit comprising a stack of layers of reflective and opaque aspect able to be thermally tempered, i.e. able to withstand heat treatments such as thermal tempering, bending and annealing without notable degradation of the properties of the final product.

Reflective panels according to the invention may have various applications. They may be used as reflective decorative or cladding panels, in interior or exterior applications such as elements of shelves, cupboards, doors, wall coatings, ceilings, stands, glazed tables, wall lamps, partitions, store fronts, façade panels, window breasts, in furnishings, wardrobes or bathrooms, in swimming pools or spas, in make-up cases or compacts or in the automotive industry as vehicle rear-view mirrors for example. Such applications may require thermally tempered glazing units for reasons of safety and to increase flexural strength and shock resistance.

Generally, in a good number of these applications, it is silver-based mirrors that are used, often produced by wet chemical processes. In these processes, a silver layer is deposited by reduction reaction of an ammoniacal silver nitrate solution on a flat or curved glass sheet. This silver layer is then covered with a protective copper layer or treated with a passivating solution. Next, one or more coats of paint are deposited in order to produce the final mirror. These various elements ensure that the mirror ages acceptably and has a satisfactory mechanical strength and corrosion resistance. Such mirrors are for example described in document FR 2 719 839. For an application requiring a tempered mirror, the wet deposition must be carried out on an already tempered glass pane of set size.

EP 962 429 describes a glazing unit comprising a stack of layers of reflective metallic aspect and able to withstand heat treatments, said stack being deposited by cathode sputtering. It comprises a dielectric base layer (made of $SiO_2$, $Al_2O_3$, SiON, $Si_3N_4$ or AlN), a highly reflective essentially metal layer (based on Cr, an alloy containing Cr or an alloy containing Al) and an exterior covering layer made of a dielectric ($Si_3N_4$, AlN). The glazing units according to EP 962 429 have a glass-side light reflectance ($RL_V$) higher than 50% and a light transmission (TL) of 2 to 15% and preferably from 4 to 10%. To manufacture opaque glazing units for use as window breasts, EP 962 429 teaches applying an additional colored layer (for example made of enamel) on the stack of layers described above.

According to one of its aspects, the subject of the present invention is a coated substrate as claimed in claim 1, the dependent claims defining preferred embodiments.

The invention relates to a substrate coated with a stack of layers comprising, in order, at least (i) a transparent substrate; (ii) a first chromium-based layer; (iii) a dielectric layer making direct contact with the first chromium-based layer; and (iv) a second chromium-based layer making direct contact with the dielectric layer.

Such coated substrates, by virtue of this specific trio of chromium/dielectric/chromium layers, have the advantage of providing panels that are:

reflective, having a glass-side light reflectance $RL_V>40\%$ and preferably >50%;
opaque, having a light transmission TL<2%, preferably <1% and more preferably <0.5%;
able to be used both without having undergone a heat treatment and after heat treatment;
of neutral aspect (−5<a*<5, preferably −3<a*<3 and −5<b*<5 and preferably −3<b*<3 under illuminant D65);
intermixable—thermally untreated and treated versions are combinable as the glass-side color of these coated substrates does not change during heat treatment (glass-side $\Delta E_{cmc}$ lower than 5 and preferably lower than 3);
resistant to customary chemical durability tests (CASS test, neutral salt spray test, condensation test, environmental chamber testing, Cleveland test);
obtained by a more environmentally friendly process (cathode sputtering process in comparison to a wet process); and
do not require a, generally expensive, layer of paint or enamel and avoid using lead, which is conventionally present in the paints used for mirrors.

The transparent substrate according to the invention is preferably a glazing substrate, for example a float glass, soda-lime, clear, colored or extra-clear (i.e. lower Fe content and higher TL) substrates possibly having a thickness typically comprised between 2 and 10 mm. However, the invention may also apply to plastic substrates, for example made of PMMA. It is necessary for the substrate to be transparent because, when such a panel is used, the light passes a first time through the substrate, is reflected from the stack of layers according to the invention and then passes a second time through the substrate. A user looking at his or her image in a reflective panel according to the invention is therefore facing the "substrate" side of the panel, the stack of layers being located on the other face of the substrate, i.e. that opposite the user.

The expression "chromium-based layer" is understood to mean a layer comprising at least 50% by weight chromium, preferably at least 60%, at least 70% or at least 80% and even more preferably comprising at least 90% by weight chromium or at least 95%. Advantageously, the chromium-based layers essentially consist of chromium, i.e. they consist of chromium that may nonetheless contain other minor components provided that the latter do not affect the essential properties of the basic composition.

Advantageously, the dielectric layer according to the invention comprises, or more preferably, essentially consists of, a material having an absorption coefficient k at a wavelength of 550 nm lower than 0.1, and a refractive index n at a wavelength of 550 nm comprised between 1.3 and 2.8. Preferably, the dielectric layer comprises, or essentially consists of, a material chosen from zinc oxides, tin oxides, mixed zinc-tin oxides, titanium oxides, silicon oxides, aluminum oxides, zirconium oxides, niobium oxides, aluminum nitrides, silicon nitrides and mixtures of at least two thereof. Oxides or nitrides of silicon or aluminum are generally preferred for their particular resistance to heat treatments. More preferably, the dielectric layer essentially consists of silicon nitride. The expression "layer essentially consisting of silicon nitride" is also understood to mean layers doped with at least one other element and containing up to at most about 10% by weight of this at least one other element, said doped layers having dielectric properties that are practically no different from those of pure silicon nitride layers (for example, layers deposited by cathode sputtering processes using a silicon target containing up to 10% by weight aluminum). The dielectric layer according to the invention may furthermore consist of a plurality of individual layers comprising or essentially consisting of the above materials.

The geometric thickness of the first chromium-based layer is preferably at least 15 nm or at least 20 nm and more preferably at least 25 nm; it is preferably at most 50 nm or at most 45 nm and more preferably at most 40 nm. The main function of the first chromium-based layer is reflection and such thicknesses are particularly well suited to this function, in addition to satisfying the other properties of the panel according to the invention.

The optical thickness of the dielectric layer is preferably at least 100 nm or at least 110 nm and more preferably at least 120 nm; it is preferably at most 200 nm or at most 190 nm and more preferably at most 180 nm. It will be recalled that the optical thickness of a layer is the product of the geometric thickness of the layer and the refractive index of the material forming the layer. The main functions of the dielectric layer are to increase the reflection already obtained with the first chromium-based layer and to adjust color and therefore neutrality; such thicknesses are particularly well suited to this function, in addition to satisfying the other properties of the panel according to the invention. If the dielectric layer consists of a plurality of sublayers, the thickness of the dielectric layer is equal to the sum of the thicknesses of these individual layers. In the preferred case of a dielectric layer essentially consisting of silicon nitride, the geometric thickness of the latter is preferably comprised between 50 and 100 nm and more preferably between 60 and 90 nm.

The geometric thickness of the second chromium-based layer is preferably at least 50 nm or at least 80 nm and more preferably at least 100 nm. The opaqueness of the panel is the main function of this layer. Such thicknesses are particularly well suited to ensuring this opaqueness and chemical and mechanical durability, in addition to satisfying the other properties of the panel according to the invention. Thicknesses larger than 150 nm offer no real advantage on these points, but in contrast increase cost and lower deposition speed; they are therefore not advantageous.

In certain forms of the invention, the stack of layers furthermore comprises, by way of last layer of the stack (side opposite the substrate), a protective layer essentially consisting of carbon, preferably having a geometric thickness comprised between 1 and 10 nm. This layer provides the coated panel with additional mechanical protection before heat treatment, and is intended to burn during the heat treatment.

In other embodiments of the invention, other layers may be present: whether on the substrate, on the face opposite that carrying the stack of layers according to the invention (for example an antireflection layer), or between the substrate and the first chromium-based layer (for example a barrier layer), or even above the second chromium layer (for example a layer improving scratch resistance), provided that these layers do not degrade the aforementioned properties of the invention.

Coated substrates according to the invention have a glass-side light reflectance ($RL_V$-D65-2°) of at least 40% or at least 45%, preferably of at least 50% and even of at least 52% or at least 54%, before and after the optional heat treatment. Their light transmission (TL-D65) is lower than 2% or than 1% and preferably lower than 0.5%, also before and after the optional heat treatment.

Coated, substrates according to the invention furthermore have a neutral hue when they are examined in reflection from the glass side, i.e. their a* and b* values (CIELAB L*a*b* values-D65-10°) are such that $-5<a*<5$ and $-5<b*<5$ and preferably $-3<a*<3$ and $-3<b*<3$. Moreover, this hue is almost the same after the heat treatment. Specifically, the glass-side $\Delta E_{cmc}$ (according to the "Colour Measurement Committee of the Society of Dyes and Colourists of Great Britain") between a coated substrate before heat treatment and the same coated substrate after heat treatment is smaller than 5 and preferably smaller than 3, i.e. invisible to the naked eye. All the reported here were measured and calculated using illuminant D65, observer: 10°, l=1.35 and c=1.2.

The coated substrates according to the invention are resistant to customary chemical durability tests: Thus they resist, both before and after the optional heat treatment:
  the CASS test according to standard ISO 9227-2006, preferably for at least 5 days;
  the neutral salt spray (NSS) test according to standard EN1096-2:2001, preferably for at least 20 days;
  the condensation test according to standard EN1036-2008, preferably for at least 20 days;
  environmental chamber testing according to standard EN1036-2008, preferably for at least 21 days; and
  the Cleveland test according to standard ISO 6270-1: 1998, preferably for at least 15 days.

Preferably, they are, both before and after the optional heat treatment, compatible with and therefore chemically resistant to the adhesives customarily used to fasten the panels to a support (for example: alkoxy adhesives and acetic adhesives), as measured by the water-bath test described below. Preferably, they also resist the traction test described below.

Advantageously, they also have a good mechanical durability and are, both before and after the optional heat treatment, resistant:
  to the automatic wet rub test (AWRT) described below, preferably for at least 1000 cycles;
  to the dry brush test (DBT) according to standard ASTM D2486-00 (test method "A"), preferably for at least 1000 cycles; and
  to the felt test according to standard EN1096-2:2001, preferably for at least 500 cycles.

The layers according to the invention are advantageously deposited on the substrate by a physical vapor deposition (PVD) system, for example by magnetron reactive vacuum cathode sputtering.

Automatic Wet Rub Test (AWRT)

A piston covered with a wet cotton cloth that is kept wet is brought into contact with the layer to be evaluated and moved back and forth over its surface. The piston bears a weight so as to apply a force of 33 N to a finger having a diameter of 17 mm. The rubbing of the cotton over the coated surface damages (removes) the layer after a certain number of cycles. The test is used to define the limit at which the layer discolors (partial removal of the layer) and scratches appear therein. The test is carried out for 10, 50, 100, 250, 500 and 1000 cycles in various separate locations on the sample. The sample is observed under an artificial sky in order to determine whether discoloration or scratching of the sample is visible in reflection. The AWRT result indicates the number of cycles resulting in no or very little degradation (invisible to the naked eye under a uniform artificial sky at a distance of 80 cm from the sample).

Water-Bath Test

An adhesive pad with a diameter of about 5 cm is deposited on the back of a 10×10 cm sample (stack side). The adhesive thickness is set to 2 mm. The samples tested are submerged in a water bath immediately after application of the adhesive. The temperature of the water in the water bath is set to 35° C. For each family of adhesives, a separate water bath is used. The test lasts 20 days. The results of this test are evaluated by way of four categories:

unacceptable: a haze modification is noted when the sample is observed under daylight;

borderline: a haze modification is noted when the sample is observed in a dark room under diffuse light;

acceptable: a haze modification is noted when the sample is observed in a dark room under directed light; and OK: no haze modification is noted.

Traction Test

Two samples are adhesively bonded to each other (via their stack-coated faces) by means of an adhesive pad having a diameter of about 2 cm, and left to dry. The thickness of the adhesive is set to 2 mm. The assembly is then subjected to a tensile force acting to separate the samples from each other. The value of the applied force required to separate the samples via a cohesive break, i.e. a break within the adhesive (as opposed to an adhesive break, i.e. separation between the adhesive and the layers) is noted. The latter is preferably higher than or equal to 3 kg/cm$^2$.

Particular embodiments of the invention will now be described by way of example. Properties were measured under illuminant D65.

EXAMPLE 1

On an industrial vacuum coating line a soda-lime float glass substrate of about 4 mm in thickness was coated by magnetron cathode sputtering with a stack of layers, therefore forming a coated substrate having the following structure:

glass/Cr[33 nm]/Si$_3$N$_4$[74 nm]/Cr[110 nm]

(the thicknesses given between the square brackets are geometric thicknesses).

It exhibited an RL$_V$ of 55% and a color in reflection on the glass side characterized by an L*=79.1, an a*=−2 and a b*=−1.8. Moreover, the color was angularly stable, i.e. it did not vary with the angle of observation of the panel (see Table I).

TABLE I

| Angle of observation | ΔL* | Δa* | Δb* | Angular stability ΔE$_{cmc}$ |
|---|---|---|---|---|
| standard: 8° | — | — | — | — |
| 15° | 0.2 | −0.1 | 0.0 | 0.14 |
| 25° | 0.3 | −0.2 | 0.1 | 0.29 |
| 35° | 0.5 | −0.3 | 0.2 | 0.49 |
| 45° | 0.5 | −0.3 | 0.3 | 0.65 |
| 55° | 0.4 | −0.3 | 0.3 | 0.65 |

The glass-side color in reflection did not change after various heat treatments at 670° C. for different times. Table II shows the variations in RL$_V$, L*, a*, b* and the ΔE$_{cmc}$ on the glass side between the panel before and after heat treatment.

TABLE II

| Heat treatment length (670°) | ΔL* | Δa* | Δb* | ΔRL$_V$ | ΔE$_{cmc}$ |
|---|---|---|---|---|---|
| 7 min | −0.2 | −0.2 | −0.7 | −0.39 | 0.9 |
| 9 min | −0.3 | −0.3 | −0.6 | −0.49 | 0.9 |
| 11 min | −2.5 | −0.1 | 0.9 | −4.13 | 1.8 |
| 13 min | −2.4 | −0.1 | 0.8 | −3.93 | 1.7 |
| 17 min | −4.3 | −0.1 | 1.6 | −7.04 | 3.2 |

Moreover, the color after heat treatment was also angularly stable. Table III shows variations as a function of the angle of observation for a sample after a 9 minute long heat treatment at 670° C. (sample originally at room temperature, then placed for 9 minutes in a furnace at 670° C.—treatment broadly simulating a thermal temper).

TABLE III

| Angle of observation | ΔL* | Δa* | Δb* | Angular stability ΔE$_{cmc}$ |
|---|---|---|---|---|
| standard: 8° | — | — | — | — |
| 15° | 1.4 | −0.1 | −0.2 | 0.80 |
| 25° | 1.6 | −0.2 | −0.1 | 0.88 |
| 35° | 1.5 | −0.3 | 0.0 | 0.85 |
| 45° | 0.5 | −0.3 | 0.3 | 0.56 |
| 55° | −0.2 | −0.3 | 0.2 | 0.45 |

Samples of this coated substrate, certain of which were not subjected to a heat treatment and others of which were subject to a heat treatment, all successfully passed the various mechanical and chemical durability tests mentioned above:

CASS test, 5 days;

neutral salt spray test, 20 days;

condensation test, 20 days;

environmental chamber testing, 21 days; and

Cleveland test, 15 days;

compatibility OK and traction resistance (≥3 kg/cm$^2$) with alkoxy adhesives and acetic adhesives;

AWRT test, 1000 cycles: no or very little degradation (to the naked eye under a uniform artificial sky at a distance of 80 cm from the sample);

dry brush test (DBT), 1000 cycles: no or very little degradation (to the naked eye under a uniform artificial sky at a distance of 80 cm from the sample); and felt test, 500 cycles.

EXAMPLES 2 TO 5

Other stacks, in which the dielectric layer is formed of a plurality of distinct sublayers, were simulated on a glass pane of 4 mm. The stacks also exhibited a good reflectance and a good neutrality (Table IV).

(ZSO$_5$=mixed zinc-tin oxide, in a proportion of 50-50 wt %)

TABLE IV

| Stack layer (geometric thicknesses in nm) | | | | | RL$_V$ | L* | a* | b* |
|---|---|---|---|---|---|---|---|---|
| Cr | Si$_3$N$_4$ | ZSO$_5$ | Cr | | 55 | 79.1 | −2 | −1.8 |
| 33 | 37 | 37 | 110 | | | | | |
| Cr | Si$_3$N$_4$ | SiO$_2$ | Cr | | 55 | 79.1 | −2 | −1.7 |
| 33 | 50 | 28 | 110 | | | | | |
| Cr | Si$_3$N$_4$ | ZSO$_5$ | Si$_3$N$_4$ | Cr | 55.1 | 79.1 | −2 | −1.8 |
| 33 | 30 | 14.3 | 30 | 110 | | | | |
| Cr | Si$_3$N$_4$ | SiO$_2$ | Si$_3$N$_4$ | Cr | 55.1 | 79.1 | −2 | −1.6 |
| 33 | 30 | 25.7 | 30 | 110 | | | | |

EXAMPLE 6

A glazing unit according to example 1 was coated with an additional carbon layer of 5 nm in thickness, above the second layer of chromium. This glazing unit exhibited a higher resistance to the AWRT and DBT tests than those without a carbon layer: no degradation was observed after 1000 cycles (to the naked eye under a uniform artificial sky at a distance of 80 cm from the sample).

The invention claimed is:

1. A substrate coated with a stack of layers comprising, in order, at least:
   i. a transparent substrate;
   ii. a first chromium-based layer having a geometric thickness between 15 and 50 nm;
   iii. a dielectric layer having a geometric thickness between 50 and 100 nm making direct contact with the first chromium-based layer; and
   iv. a second chromium-based layer having a geometric thickness of at least 50 nm making direct contact with the dielectric layer.

2. The coated substrate as claimed in claim 1, wherein the chromium-based layers essentially consist of chromium.

3. The coated substrate as claimed in claim 1, wherein the dielectric layer comprises a material having an absorption coefficient k at a wavelength of 550 nm lower than 0.1, and a refractive index at a wavelength of 550 nm between 1.3 and 2.8.

4. The coated substrate as claimed in claim 1, wherein the dielectric layer comprises a material selected from the group consisting of zinc oxides, tin oxides, mixed zinc-tin oxides, titanium oxides, silicon oxides, aluminum oxides, zirconium oxides, niobium oxides, aluminum nitrides, silicon nitrides and mixtures of at least two thereof.

5. The coated substrate as claimed in claim 1, wherein the dielectric layer essentially consists of silicon nitride.

6. The coated substrate as claimed in claim 5, wherein a geometric thickness of the dielectric layer is between 60 and 90 nm.

7. The coated substrate as claimed in claim 1, wherein the geometric thickness of the first chromium-based layer is between 25 and 40 nm.

8. The coated substrate as claimed in claim 1, wherein the geometric thickness of the second chromium-based layer is at least 80 nm.

9. The coated substrate as claimed in claim 1, wherein an optical thickness of the dielectric layer is between 100 and 200 nm.

10. The coated substrate as claimed in claim 1, wherein the stack of layers furthermore comprises a protective last layer of the stack essentially consisting of carbon.

11. The coated substrate as claimed in claim 10, wherein the protective layer essentially consisting of carbon has a geometric thickness between 1 and 10 nm.

12. The coated substrate as claimed in claim 1, wherein the coated substrate has a glass-side light reflectance of at least 40%.

13. The coated substrate as claimed in claim 1, wherein the coated substrate is thermally temperable and after a heat treatment the coated substrate has a glass-side $\Delta E_{cmc(1.35:1.2)}$ lower than 5, in comparison to the coated substrate before said heat treatment.

14. The coated substrate as claimed in claim 1, wherein an optical thickness of the dielectric layer is between 120 and 180 nm.

15. The coated substrate as claimed in claim 1, wherein the coated substrate is thermally temperable and that after a heat treatment the coated substrate has a glass-side $\Delta E_{cmc(1.35:1.2)}$ lower than 3, in comparison to the coated substrate before said heat treatment.

16. The coated substrate as claimed in claim 1, wherein the chromium-based layers comprise at least 90% by weight chromium.

17. The coated substrate as claimed in claim 1, wherein the coated substrate has a visible light transmission (TL) less than 2%.

18. A substrate coated with a stack of layers comprising, in order, at least:
   i. a transparent substrate;
   ii. a first chromium-based layer having a geometric thickness between 15 and 50 nm;
   iii. a dielectric layer making direct contact with the first chromium-based layer; and
   iv. a second chromium-based layer having a thickness of greater than 50 nm making direct contact with the dielectric layer,
   wherein the coated substrate has a visible light transmission (TL) less than 2%.

19. The coated substrate as claimed in claim 18, wherein the chromium-based layers consist essentially of chromium.

* * * * *